United States Patent

[11] 3,618,672

[72] Inventors Jerome L. Fueslein
 Linden;
 Walter Mayer, Stockton, both of Calif.
[21] Appl. No. 888,686
[22] Filed Dec. 29, 1969
[45] Patented Nov. 9, 1971
[73] Assignee International Harvester Company
 Chicago, Ill.

[54] MECHANISM FOR POSITIONING REAR GANG OF OFFSET DISK HARROW
 4 Claims, 4 Drawing Figs.
[52] U.S. Cl. ................................ 172/320,
 172/582, 172/584, 172/600, 172/667
[51] Int. Cl. ....................................... A01b 23/04,
 A01b 15/14
[50] Field of Search ........................................ 172/320,
 568, 569, 571, 572, 574, 576, 580, 581, 582, 584,
 591, 596, 597, 589, 599, 600, 667, 679

[56] References Cited
 UNITED STATES PATENTS
2,406,866 9/1946 Thompson ................... 172/596
1,836,227 12/1931 Curry et al. .................. 172/597
2,251,788 8/1941 Goble ......................... 172/589
2,568,082 9/1951 McKay ....................... 172/596
2,587,387 2/1952 Rutter ........................ 172/589
2,604,746 7/1952 Frank et al. ................. 172/568
2,608,814 9/1952 Frank ......................... 172/596
2,608,813 9/1952 Frank ......................... 172/597
2,610,455 9/1952 Oehler et al. ................ 172/596
3,033,295 5/1962 Brundage .................... 172/582
3,519,085 7/1970 Heckathorn et al. ......... 172/597
 FOREIGN PATENTS
536,073 1/1957 Canada ...................... 172/580
562,548 9/1958 Canada ...................... 172/679

Primary Examiner—Robert E. Pulfrey
Assistant Examiner—C. W. Hanor
Attorney—Floyd B. Harman ABSTRACT: An agricultural implement having front and rear gangs of earth-working tools being interconnected in such a manner that they may easily be adjusted from a transport to a field-operating position and also laterally adjusted with respect to each other to provide the proper tool relationship between said front and rear gangs of earth-working tools for various field-operating conditions.

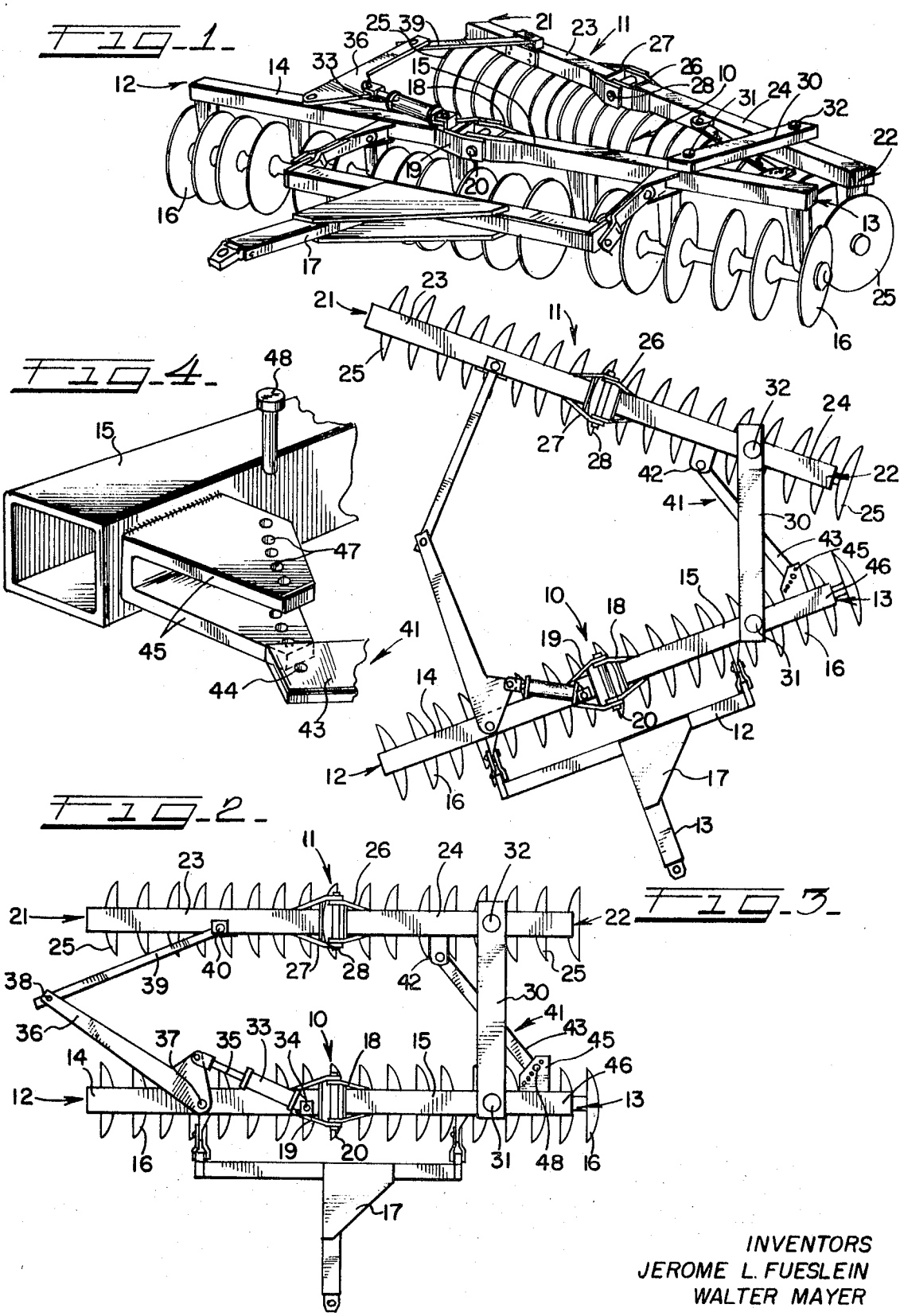

MECHANISM FOR POSITIONING REAR GANG OF OFFSET DISK HARROW

BACKGROUND AND SUMMARY OF THE INVENTION

The present invention relates to agricultural implements and particularly to disk harrows. Specifically, the invention relates to a disk harrow of the offset type. Disk harrows of the class contemplated by this invention comprise front and rear disk gangs interconnected at one end for horizontal swinging between a parallel or transport position and angled or operating positions. It is well recognized in the art that to provide for proper soil preparation, provisions must be made for laterally adjusting one of the gangs relative to the other to provide a smooth finished soil surface such that the rear disk gang fills the furrows created by the front disk gang. Generally, such lateral adjustment must be made each time the operator changes the angled operating position of the harrow. Also, any lateral adjustment required the loosening and often the removal and repositioning of a number of fasteners and complicated linkages used to move the gangs relative to each other to allow the gangs to return together in parallel relationship for transport.

It is therefore, an object of this invention to provide a means for laterally adjusting the gangs of a disk harrow relative to each other to maintain this laterally adjusted relationship for various angled operating positions of the harrow.

It is also an object of this invention to provide a novel means for easily adjusting the gangs of a disk harrow laterally relative to each other without repositioning any of the linkage necessary to move the gangs relative to each other such that the gangs will always return to a parallel relationship for transport.

BRIEF DESCRIPTION OF THE DRAWINGS

FIG. 1 is a perspective view of the disk harrow shown in an operating position;

FIG. 2 is a plan view of the harrow of this invention showing the parallel relationship of the front and rear disk gangs when the implement is being transported, and showing the means for laterally adjusting the rear gang relative to the front gang;

FIG. 3 is a plan view of the harrow of this invention showing the angled operating relationship of the front and rear disk gangs, and showing the means for laterally adjusting the rear gang relative to the front gang; and FIG. 4 is a perspective view showing one method of interconnecting the lateral adjusting means shown in FIGS. 2 and 3.

DESCRIPTION OF THE PREFERRED EMBODIMENT

In the drawings the numerals 10 and 11 refer, respectively, to the front and rear sections of a disk harrow. The front harrow section 10 consists of transversely aligned disk gang sections 12 and 13 comprising aligned supporting frame members 14 ad 15 upon which is mounted a plurality of discs 16 the concave sides of which are directed to the right of the direction of travel in FIG. 1. The disk gang sections 10 and 11 are of conventional construction and are provided with a hitch structure 17 connected to frame members 14 and 15, for attachment to a tractive vehicle, not shown.

Gang sections 12 and 13 are flexibly connected due to the substantial width of the implement, and also to allow the implement to follow the contour of the ground, by the provision at their inner ends of clevises 18 and 19 mounted on a horizontal longitudinally extending pivot pin 20.

The rear disk gang 11 is constructed similarly to the front gang 10 and includes a pair of transversely aligned disk gang sections 21 and 22 comprising rear frame members 23 and 24 carrying a plurality of discs 25, the concave faces of which are directed to the left of the direction of travel in FIG. 1. The rear gang 11 is flexibly constructed in the same manner as the front gang 10 and clevises 26 and 27 are secured to the inner ends of rear frame members 23 and 24, respectively, and mounted upon a horizontal longitudinally extending pivot pin 28.

The front harrow section 10 and the rear harrow section 11 are interconnected at one end by beam member 30. The beam member 30 is pivotally connected to the front harrow section 10 by pivot member 31 and is pivotally connected to the rear harrow section by pivot member 32.

Movement of the harrow sections 10 and 11 relative to each other to selected angled operating positions may be accomplished by any suitable means such as by the conventional means of a hydraulic ram 33 pivotally connected to the front frame member 14 by pivot member 34. The piston rod 35 of the hydraulic ram is pivotally connected to one arm of a bellcrank 36 pivotally connected to the front frame member 14 by pivot member 37. The other arm of the bellcrank 36 is connected by pivot member 38 to link 39 which is pivotally connected to the rear frame member 23 by pivot member 40. This structure is shown in the U.S. Pat. to Kramer No. 2,931,447.

To provide for the lateral adjustment between the front harrow section 10 and the rear harrow section 11, one end of a bar or link 41 is pivotally mounted on a lug 42 secured to and projecting forwardly from frame member 24 at a point substantially between the clevis 26 and the rear portion of the beam member 30. As shown in FIG. 2, the harrow is in the transport position with the front harrow section 10 and the rear harrow section 11 parallel with respect to each other. In this position, the free end 43 of link 41 having an opening 44 therein, is adapted to fit between a pair of spaced-apart lugs 45, as shown in FIG. 4, secured to and projecting rearwardly from frame member 15 at a point substantially between the front portion of the beam member 30 and the end 46 of frame member 15. The lugs 45 are provided with a number of registering openings 47 adapted to carry a pin 48 receivable in opening 44 at the free end 43 of link 41. The registering openings 47 in lugs 45 are located on an arc about the pivot axis of link 41 on lug 42.

As shown in FIG. 2, when the front harrow section 10 and the rear harrow section 11 are in the parallel or transport position, and will open to the position shown in FIG. 3. If it is desired that the rear harrow section 11 be laterally adjusted to the right relative to the front harrow section 10 when opened this can be accomplished by moving link 41 to the left on the arc of adjustment defined by the registering openings 47. To move the rear harrow section 11 to the left relative to the front harrow section 10, relative to the position of FIG. 3, link 41 is moved to the right on the arc of adjustment.

When the harrow sections 10 and 11 are opened to any angled operating position, as shown in FIG. 3, by the extension of the piston rod 35 from a hydraulic ram 33, the location of link 41 on the arc of adjustment, as defined by the registered openings 47, will determine the lateral position of the rear harrow section 11 with respect to the front harrow section 10. When the harrow sections 10 and 11 are closed to their parallel transport position the lateral relationship between the rear harrow section 11 and the front harrow section 10 will always be the same, since in the transport position the arc of adjustment, as defined by the openings 47, is the same as the arc of opening 44 about the pivot axis of the link 41 on lug 42. It is only when the harrow sections 10 and 11 are opened, as shown in FIG. 3, that the arc about the pivot axis of link 41 on lug 42 and the arc of adjustment, as defined by the openings 47, are not coincident resulting in a lateral shifting of the rear harrow section 1 with respect to the front harrow section 10.

It is believed that the construction and operation of the novel means for laterally adjusting the gangs of a disk harrow will be clearly understood from the foregoing description.

What is claimed is:

1. In a disk harrow wherein there are front and rear elongated gangs, means interconnecting said gangs adjacent respective corresponding ends thereof to adapt relative pivoting thereof from a transport position wherein the gangs are parallel and at a set lateral relationship to an operating position wherein said gangs are at an angle to one another and at a selected lateral relationship, and means for retaining the gangs selectively in the transport and operating positions, an improvement in said interconnecting means, comprising: nonparallel first and second link structures each having opposite ends respectively connected with said gangs and being pivotal relatively thereto attendant to adjustment of said gangs between the transport and operating positions, said first link pivotally connected at opposite ends to the front and rear gangs, the pivotal connection between one end of said second link structures and one of the gangs being adjustable while the gangs are in the transport position along an arc described about the pivotal connection between the opposite end of said second link structure with the other gang, and means for retaining the adjustment selectively along said arc to effect relative longitudinal displacement of the gangs pursuant to their adjustment from the transport position to the operating position in an amount correlated with the selected position of adjustment along said arc.

2. The invention as set forth in claim 1, wherein said nonparallel link structures are disposed within vertical planes which intersect between the gangs.

3. In a disk harrow wherein there are front and rear disk gangs, means interconnecting said gang adjacent respective corresponding ends thereof to adapt their relative movement between a transport position, wherein the gangs are parallel and at a set lateral relationship, and an operating position, wherein the gangs form an angle diverging away from said ends and at a selected lateral relationship, and means for varying the angular and lateral relationship of said interconnected gangs when in the operating position, the improvement in said interconnecting means comprising, means for laterally adjusting said gangs to vary the combined lateral extent thereof comprising: a first rigid link pivotally connected at opposite ends to the front and rear gangs, a second rigid link extending between said gangs, a first pivot means connecting one end of said second link to one of said gangs for relative pivoting about a vertical axis, and adjustable pivot means adapted to connect the other end of said second link with the other gang at selected positions along an arc generated about the first pivot means while the gangs are parallel, and said adjustable pivot means being operable to control said interconnecting means to vary the relative axial positions of said gangs and their combined overall extent in an amount correlated with the selected position of adjustment along said arc, attendant to movement of the gangs into the operating position.

4. The invention as set forth in claim 3, wherein said selected positions are a plurality of openings on an arcuate locus generated about said first pivot means.

* * * * *